United States Patent [19]

Shekleton

[11] Patent Number: 5,054,284
[45] Date of Patent: Oct. 8, 1991

[54] COMBUSTION HEATED AIR TURBINE STARTER SYSTEM

[75] Inventor: Jack R. Shekleton, San Diego, Calif.

[73] Assignee: Sundstrand Corporation, Rockford, Ill.

[21] Appl. No.: 582,017

[22] Filed: Sep. 13, 1990

Related U.S. Application Data

[63] Continuation of Ser. No. 324,805, Mar. 17, 1989, abandoned.

[51] Int. Cl.[5] .............................................. F02C 1/00
[52] U.S. Cl. ...................................... 60/39.142; 60/262
[58] Field of Search ............... 60/39.142, 39.141, 39.07, 60/39.06, 261, 262

[56] References Cited

U.S. PATENT DOCUMENTS

| 2,852,915 | 9/1958 | Jendrassik | 60/39.45 |
| 3,098,626 | 7/1963 | Messinger | 60/39.142 |
| 4,693,073 | 9/1987 | Blackburn | 60/39.142 |
| 4,777,793 | 10/1988 | Weigard et al. | 60/39.142 |

FOREIGN PATENT DOCUMENTS

| 2053291 | 5/1972 | Fed. Rep. of Germany | 60/39.142 |
| 798704 | 7/1958 | United Kingdom | 60/39.142 |

OTHER PUBLICATIONS

Rodgers, C., "Impingement Starting and Power Boosting of Small Gas Turbines", Journal of Engineering for Gas Turbines and Power, pp. 821–827, Oct., 1985.

Primary Examiner—Richard A. Bertsch
Assistant Examiner—Timothy S. Thorpe
Attorney, Agent, or Firm—Wood, Phillips, Mason, Recktenwald & Van Santen

[57] ABSTRACT

In order to enhance the effectiveness of an air turbine starter 12, an auxiliary or emergency power unit 16 is adapted to deliver air through a bleed duct 18. This bleed duct 18 is in communication with the air turbine starter 12 which, in turn, is operatively associated with a main turbine engine 14. By placing a combustor 20 within the bleed duct 18 at a point upstream of the air turbine starter 12, it is possible to combust fuel from a source with air form the auxiliary or emergency power unit 16. This substantially increases the available power by elevating air temperature rather than inceasing size of the auxiliary or emergency power unit 16. Since it is possible to preheat the air in the bleed duct 18, the air turbine starter 12 can be driven by a smaller auxiliary or emergency power unit 16 to start the main turbine engine 14.

8 Claims, 1 Drawing Sheet

COMBUSTION HEATED AIR TURBINE STARTER SYSTEM

This application is a continuation of application Ser. No. 324,805, filed Mar. 17, 1990 now abandoned.

FIELD OF THE INVENTION

The present invention is directed to an air turbine starter and, more particularly, a combustion heated air turbine starter system.

BACKGROUND OF THE INVENTION

Many gas turbine engines utilize a small turbine powered by hot pressurized air for starting a main turbine engine. These small turbines, typically known as air turbine starters, commonly have air delivered to them at high air temperatures on the order of 1175° F. For this purpose, the air turbine starters are conventionally adapted to receive compressed air from a ground cart or the like.

As an alternative, an auxiliary or emergency power unit might conveniently be utilized to deliver air to the air turbine starters. Unfortunately, due to the typical low temperature of air from such sources, e.g., on the order of 400° F., much power would be lost. For this reason, the auxiliary power unit would necessarily need to be larger to supply a greater volume of air to compensate for the power loss.

Of course, this is most undesirable in aircraft where weight constraints are known to be of considerable concern. Thus, any increase in the size of the auxiliary or emergency power unit would necessarily result in substantially increased cost, weight and space requirements. In addition, depending upon the approach, it could turn out that a substantially increased pressure loss would be encountered.

The present invention is directed to overcoming the above stated problems by providing a unique combustion heated air turbine starter system.

SUMMARY OF THE INVENTION

It is a principal object of the invention to provide a new and improved combustion heated air turbine starter system. More specifically, it is an object of the invention to provide such an air turbine starter system wherein combustion is utilized to heat air from an auxiliary or emergency power unit upstream of the air turbine starter. Furthermore, it is an object of the invention to provide a unique combustor in a bleed duct for delivering air to an air turbine starter.

An exemplary embodiment of the invention achieves the foregoing objects in a combustion heated air turbine starter system which includes an air turbine starter operatively associated with a main turbine engine. The system also includes an auxiliary or emergency power unit adapted to deliver air through a bleed duct to the air turbine starter together with means for combusting fuel from a source with air from the power unit. In this connection, the combusting means preferably comprises an auxiliary combustor disposed in coaxial relation within the bleed duct at a point upstream of the air turbine starter.

Preferably, the auxiliary combustor includes an outer wall positioned in radially inwardly spaced relation to the bleed duct. With this arrangement, the outer wall defines a combustion air flow path inwardly thereof and a bypass air flow path outwardly thereof with the combustor including a fuel injector positioned centrally of the outer wall at the upstream end thereof. In addition, the auxiliary combustor may include a plurality of radially extending air swirlers at the upstream end of the outer wall.

In a preferred embodiment, an igniter extends radially of the bleed duct to ignite the fuel and the air in the auxiliary combustor. The igniter may, thus, also serve as a support extending between the bleed duct and the outer wall of the auxiliary combustor which may also advantageously be supported circumferentially thereabout by one or more combustor support pins. Furthermore, the radially extending air swirlers may support a fuel injector in coaxial relation to the outer wall at the upstream end of the auxiliary combustor.

Other objects, advantages and features of the present invention will become apparent from a consideration of the following specification taken in conjunction with the accompanying drawings.

IN THE DRAWINGS

FIG. 1 is a schematic illustration of a combustor heated air turbine starter system in accordance with the present invention; and FIG. 2 is a cross-sectional view, partially schematic, illustrating a combustor in a bleed duct of the air turbine starter system of FIG. 1.

DETAILED DESCRIPTION OF THE PREFERRED EMBODIMENT

Figure 1:
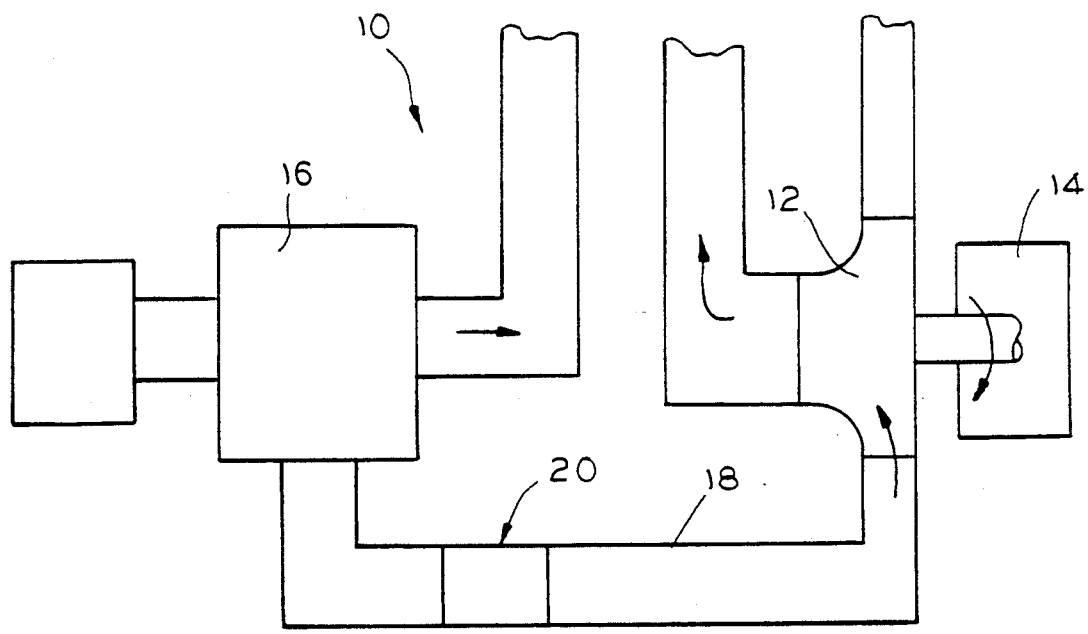

Referring to the drawings, and first to FIG. 1, the reference numeral 10 designates generally a combustion heated air turbine starter system in accordance with the present invention. The system 10 includes an air turbine starter 12 operatively associated with a main turbine engine 14, an auxiliary or emergency power unit 16 (hereinafter collectively referred to as an auxiliary power unit) which is adapted to deliver air through a bleed duct 18 to the air turbine starter 12, and means such as an auxiliary combustor 20 for combusting fuel from a source with air from the auxiliary power unit 16. With this arrangement, the auxiliary combustor 20 is disposed as shown so as to be in coaxial relation within the bleed duct 18 at a point upstream of the air turbine starter 12 (see, also, FIG. 2).

Figure 2:
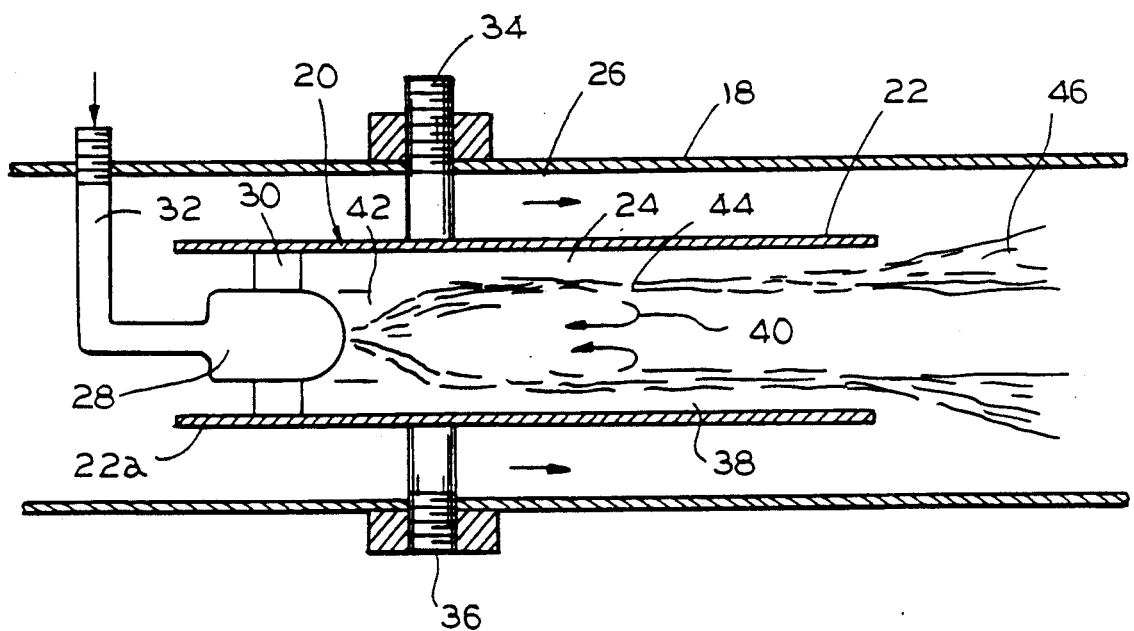

As best shown in FIG. 2, the auxiliary combustor 20 includes an outer wall 22 positioned in radially inwardly spaced relation to the bleed duct 18. The outer wall 22 defines a combustion air flow path 24 inwardly thereof and a bypass air flow path 26 outwardly thereof. Also, the auxiliary combustor 20 includes a fuel injector 28 positioned centrally of the outer wall 22 at the upstream end 22a thereof.

Still referring to FIG. 2, the auxiliary combustor 20 includes a plurality of radially extending air swirlers 30 at the upstream end 22a of the outer wall 22. These air swirlers 30 preferably are joined to both the outer wall 22 and the fuel injector 28 so as to support the fuel injector 28 in coaxial relation to the outer wall 22 of the auxiliary combustor 20. Also, as shown in FIG. 2, a fuel line 32 extends from a source of fuel, through the bleed duct 18, and to the fuel injector 28.

Still additionally, an igniter 34 which extends radially of the bleed duct 18 in a manner supporting the auxiliary combustor 20 is provided for the purpose of igniting the fuel and the air within the auxiliary combustor 20. Specifically, air flowing through the combustion air flow path 24, i.e., within the outer wall 22 of the combustor 20, is mixed with fuel from the fuel injector 28 and ignited within the auxiliary combustor 20 by means of the igniter 34. In addition to the igniter 34, a pair of combustor support pins such as 36 may be provided in circumferentially spaced relation about the bleed duct 18 to support the auxiliary combustor 20 in coaxial relation therewithin.

As will be appreciated from FIG. 2, the bleed duct 18 and the auxiliary combustor 20 are generally cylindrical. It will also be appreciated that the bleed duct 18 is radially spaced from the auxiliary combustor 20 to form the bypass air flow path 26 which is unobstructed with the exception of the small circumferential interruptions formed by the igniter 34 and the combustor support pins 36. By reason of the narrow cylindrical profile of the auxiliary combustor 20, the bleed duct 18 may be maintained at a compact uniform diameter.

By utilizing the auxiliary combustor 20 in the bleed duct 18, it is possible to use bleed air from the auxiliary power unit 16 to drive the air turbine starter 12 in an efficient manner. More specifically, there is no need to enlarge the auxiliary power unit 16 to overcome the power loss that would otherwise be present by reason of the usual low air temperature of bleed air from the auxiliary power unit 16. Since the air temperature of the bleed air is significantly elevated by the auxiliary combustor 20, there is no need to supply additional air to compensate for power loss normally caused by low bleed air temperature.

In this connection, the auxiliary combustor 20 is adapted to substantially increase bleed air temperature and, thus, the power which is available to drive the air turbine starter 12. Thus, bleed air is utilized while achieving substantial cost, weight and space savings by reason of the absence of any need to increase the size of the auxiliary power unit 16. Moreover, since the auxiliary combustor 20 is compact in length and diameter, there is no significant pressure loss of the magnitude that would be expected with a conventional can combustor.

By utilizing the radially extending air swirlers 30, a rotating annulus of air 38 is provided together with a recirculation zone 40. The fuel injector 28 may comprise a wide angle pressure atomizing injector to provide a fuel spray 42. In this manner, a laminerized blue flame 44 is achieved as described in commonly owned U.S. Pat. No. 4,373,325.

As will be appreciated, the diameter of the outer wall 22 can be adjusted larger or smaller to get more or less air in the combustor air flow path 24. The air flow through the combustion air flow path 24 can also be regulated by adjusting the swirl angle of the radially extending air swirlers 30 more or less to get less or more combustion air flow. In this manner, the combustion air flow can be fine tuned to provide optimal air/fuel ratios in the auxiliary combustor 20, e.g., in the range of 12/1 or more.

As will be appreciated by referring to FIG. 2, the laminerized blue flame 44 does not impact the outer wall 22 which, of course, causes avoidance of overheating of the outer wall 22 which is also aided by added cooling provided by bypass air flowing through the bypass air flow path 26. In this regard, the bypass air is more or less axial flow resulting in a turbulent interchange with the rotating annulus of air 38 so as to reduce the swirl downstream of the auxiliary combustor 20 to thereby achieve greater mixing together with a relatively long flame zone 46.

Despite the length of the flame zone 46, the bleed duct 18 is exposed to relatively cool gases. This occurs by reason of the bypass air which flows through the bypass air flow path 26 outwardly of the outer wall 22 of the auxiliary combustor 20. With this arrangement, a clean burning flame with low pressure loss is provided.

While in the foregoing there has been set forth a preferred embodiment of the invention, it will be appreciated that the details herein given may be varied by those skilled in the art without departing from the true spirit and scope of the appended claims.

I claim:

1. A combustion heated air turbine starter system, comprising:
   an air turbine starter operatively associated with a main turbine engine;
   an auxiliary power unit adapted to deliver air through a bleed duct to said air turbine starter; and
   means for combusting fuel from a source with air from said auxiliary power unit;
   said combusting means including an auxiliary combustor disposed within said bleed duct upstream of said air turbine starter, said auxiliary combustor including an outer wall positioned in radially inwardly spaced relation to said bleed duct, said outer wall defining an axial combustion air flow path inwardly thereof and an axial bypass air flow path outwardly thereof;
   said auxiliary combustor including a fuel injector positioned centrally of said outer wall at an open upstream end thereof, said auxiliary combustor also including means for producing a rotating annulus of air about said fuel injector at said open upstream end of said outer wall;
   said rotating annulus of air causing a laminerized blue flame to be produced in radially inwardly spaced relation to said outer wall and said rotating annulus of air mixing with air in said axial bypass air flow path downstream of said outer wall to produce a flame zone radially inwardly of said bleed duct.

2. The combustion heated air turbine starter system as defined in claim 1 wherein said auxiliary combustor is disposed so as to be in coaxial relation within said bleed duct.

3. The combustion heated air turbine starter system as defined in claim 3 wherein said means for producing a rotating annulus of air includes a plurality of radially extending air swirlers at said open upstream end of said outer wall.

4. The combustion heated air turbine starter system as defined in claim 2 including an igniter extending radially of said bleed duct to ignite said fuel and said air in said auxiliary combustor.

5. The combustion heated air turbine starter system as defined in claim 2 wherein said bleed duct and said auxiliary combustor are generally cylindrical and said bleed duct is radially spaced from said auxiliary combustor.

6. A combustion heated air turbine starter system, comprising:
   an air turbine starter operatively associated with a main turbine engine;
   an auxiliary power unit adapted to deliver air through a bleed duct to said air turbine starter; and
   means for combusting fuel from a source with air from said auxiliary power unit;
   said combusting means including an auxiliary combustor disposed within said bleed duct upstream of said air turbine starter, said auxiliary combustor including a fuel injector positioned at an open upstream end of a generally cylindrical wall, and including an igniter extending radially of said bleed duct to ignite said fuel and said air in said auxiliary combustor;

said generally cylindrical wall comprising an outer wall positioned in radially inwardly spaced relation to said bleed duct, said outer wall defining an axial combustion air flow path inwardly thereof and an axial bypass air flow path outwardly thereof, said auxiliary combustor including a plurality of radially extending air swirlers at said open upstream end of said outer wall;

said radially extending air swirlers producing a rotating annulus of air about said fuel injector at said open upstream end of said outer wall;

said rotating annulus of air causing a laminerized blue flame to be produced in radially inwardly spaced relation to said outer wall and said rotating annulus of air mixing with air in said axial bypass air flow path downstream of said outer wall to produce a flame zone radially inwardly of said bleed duct.

7. The combustion heated air turbine starter system as defined in claim 6 wherein said auxiliary combustor is disposed so as to be in coaxial relation to said bleed duct.

8. The combustion heated air turbine starter system as defined in claim 7 wherein said radially extending air swirlers support said fuel injector in coaxial relation to said outer wall of said auxiliary combustor.

* * * * *